US008000832B1

(12) United States Patent (10) Patent No.: US 8,000,832 B1
Schmidtke et al. (45) Date of Patent: Aug. 16, 2011

(54) SYSTEMS, METHODS, AND SOFTWARE FOR AUTOMATED DESIGN AND MANUFACTURING OF HVAC CONTROL PANELS

(75) Inventors: Troy Schmidtke, St. Paul, MN (US); Mitchell T. DeJong, St. Paul, MN (US); Dipesh Karki, Shakopee, MN (US); Ted Bartell, Princeton, MN (US)

(73) Assignee: Design Ready Controls, Inc., Rockford, MN (US)

( * ) Notice: Subject to any disclaimer, the term of this patent is extended or adjusted under 35 U.S.C. 154(b) by 310 days.

(21) Appl. No.: 12/228,258

(22) Filed: Aug. 6, 2008

Related U.S. Application Data

(60) Provisional application No. 60/963,747, filed on Aug. 6, 2007.

(51) Int. Cl.
*G06F 19/00* (2011.01)
*G06F 17/50* (2006.01)

(52) U.S. Cl. .......... 700/182; 700/97; 700/100; 700/107; 700/181; 700/185; 703/1

(58) Field of Classification Search .................. 700/97, 700/98, 100, 107, 181, 182, 185; 703/1; 715/843; 716/118, 119, 139
See application file for complete search history.

(56) References Cited

U.S. PATENT DOCUMENTS

| | | | | |
|---|---|---|---|---|
| 6,687,557 | B2 * | 2/2004 | Ouchi | 700/95 |
| 6,847,853 | B1 * | 1/2005 | Vinciarelli et al. | 700/97 |
| 2004/0194019 | A1 * | 9/2004 | Mast et al. | 715/502 |
| 2005/0096774 | A1 * | 5/2005 | Bayoumi et al. | 700/109 |
| 2006/0055704 | A1 * | 3/2006 | Kruk et al. | 345/581 |

* cited by examiner

*Primary Examiner* — Sean P Shechtman
(74) *Attorney, Agent, or Firm* — Schwegman, Lundberg & Woessner, P.A.

(57) ABSTRACT

The present inventors devised, among other things, systems, methods, and software that radically simplify and reduce the time necessary to specify, design, manufacture, and document control panels and wiring harnesses for semi-custom and custom equipment, such as HVAC equipment. One exemplary system includes a computerized product configuration module that defines product family parameters from user input and outputs a product family data structure, for example, a coded character string, to a technical design module. The technical design module, which incorporates engineering design rules for control panels and wiring modules, automatically processes the coded character string, outputting detailed engineering drawings, component listings, and even assembly instructions to robotic manufacturing equipment. The exemplary system dramatic reduces the product specification and engineering time required for any custom control panel and makes it possible for OEMs to efficiently offering more options and shorter turn-around times to its customers.

6 Claims, 13 Drawing Sheets
(4 of 13 Drawing Sheet(s) Filed in Color)

EXEMPLARY
PANEL DNA STRUCTURE 400

| DATA FIELD # | CORRESPONDING PRODUCT OPTION | DATA FIELD LENGTH |
|---|---|---|
| 1 | MODEL NUMBER | 9 |
| 2 | VOLTAGE-PHASE-FREQUENCY | 3 |
| 3 | DISCONNECT | 1 |
| 4 | SUPPLY FAN QUANTITY | 1 |
| 5 | SUPPLY FAN CONTROL | 1 |
| 6 | SUPPLY FAN HP | 4 |
| 7 | SUPPLY FAN FLA# | 4 |
| 8 | EXHAUST FAN QUANTITY: 0, 1, 2 | 1 |
| 9 | EXHAUST FAN CONTROL | 1 |
| 10 | EXHAUST FAN HP | 4 |
| 11 | EXHAUST FAN FLA# | 4 |
| 12 | CONDENSING TYPE | 2 |
| 13 | CONDENSING FAN QTY# | 1 |
| 14 | CONDENSING FAN HP# | 4 |
| 15 | CONDENSING FAN FLA# | 4 |
| 16 | COMPRESSOR 1 QTY# | 1 |
| 17 | COMPRESSOR 1 TONS# | 4 |
| 18 | COMPRESSOR 1 FLA# | 4 |
| 19 | COMPRESSOR 1B QTY# | 1 |
| 20 | COMPRESSOR 1B TONS# | 4 |
| 21 | COMPRESSOR 1B FLA# | 4 |
| 22 | COMPRESSOR 2 QTY# | 1 |
| 23 | COMPRESSOR 2 TONS# | 4 |
| 24 | COMPRESSOR 2 FLA# | 4 |
| 25 | COMPRESSOR 2B QTY# | 1 |
| 26 | COMPRESSOR 2B TONS# | 4 |
| 27 | COMPRESSOR 2B FLA# | 4 |
| 28 | DAMPERS | 2 |
| 29 | GAS HEAT | 2 |
| 30 | GAS HEAT CONTROL | 2 |
| 31 | ELECTRIC TEMPERING COIL | 2 |
| 32 | GAS HEAT FURANCE QTY# | 1 |
| 33 | ELECTRIC HEAT | 2 |
| 34 | ELECTRIC HEAT kW# | 4 |
| 35 | HEAT RECOVERY | 2 |
| 36 | ENTHALPY WHEEL PHASE | 1 |
| 37 | ENTHALPY WHEEL HP# | 4 |
| 38 | ENTHALPY WHEEL FLA# | 4 |
| 39 | COMPRESSOR CRANKCASE HEATER | 1 |
| 40 | GFCI OUTLET | 1 |
| 41 | HEAD PRESSURE CONTROL | 1 |
| 42 | LOW AMBIENT CONTROL | 1 |
| 43 | STRIP HEATER | 1 |
| 44 | ENCLOSURE CONTROL | 1 |
| 45 | UV LIGHT | 1 |

EXEMPLARY PANEL DNA CODING TABLE

| OPTIONS | CODESTRING | LOCKUPCODE |
|---|---|---|
| MODEL NUMBER | 9 | |
| VYPER 110-5 | VPR110D05 | |
| VYPER 110-8 | VPR110D08 | |
| VYPER 210-10 | VPR110D10 | |
| VYPER 210-13 | VPR210D10 | |
| VYPER 210-16 | VPR210D13 | |
| VYPER 210-18 | VPR210D16 | |
| VYPER 210-20 | VPR210D18 | |
| VYPER 210-25 | VPR210D20 | |
| VYPER 310-20 | VPR210D25 | |
| VYPER 310-25 | VPR310D20 | |
| VYPER 310-30 | VPR310D25 | |
| VYPER 310-35 | VPR310D30 | |
| VYPER 310-40 | VPR310D35 | |
| | VPR310D40 | |
| VOLTAGE-PHASE-FREQUENCY | 3 | |
| 200(208)V -3PH - 60Hz | 203 | |
| 230(240)V -3PH - 60Hz | 233 | |
| 460(480)V -3PH - 60Hz | 463 | |
| DISCONNECT | 1 | |
| NONE (POWER BLOCK) | N | |
| NON-FUSED DISCONNECT | D | |
| FUSIBLE DISCONNECT | F | |
| CIRCUIT BREAKER | C | |
| FAN SUPPLY QUANTITY | 1 | |
| ONE | 1 | |
| TWO | 2 | |
| SUPPLY FAN CONTROL | 1 | |
| VFD | V | |
| MOTOR STARTER | S | |
| SUPPLY FAN HP | 4 | |
| 1/3HP | 00.3 | |
| 1/2HP | 00.5 | |
| 3/4 HP | 00.8 | |
| 1 HP | 01.0 | |
| 1.5 HP | 01.5 | |
| 2 HP | 02.0 | |
| 3 HP | 03.0 | |
| 5 HP | 05.0 | |
| 7.5 HP | 07.5 | |
| SUPPLY FAN FLA# | 4 | 2:6 |
| EXHAUST FAN QUANTITY | 1 | |
| NONE | 0 | |
| ONE | 1 | |
| TWO | 2 | |
| EXHAUST FAN CONTROL | 1 | |
| NONE | N | |
| VFD | V | |
| MOTOR STARTER | S | |
| EXHAUST FAN HP | 4 | |
| NONE | 00.0 | |
| 1/3HP | 00.3 | |
| 1/2HP | 00.5 | |
| 3/4 HP | 00.8 | |
| 1 HP | 01.0 | |
| 1.5 HP | 01.5 | |
| 2 HP | 02.0 | |
| 3 HP | 03.0 | |
| 5 HP | 05.0 | |
| 7.5 HP | 07.5 | |
| EXHAUST FAN FLA# | 4 | 2:10 |
| CONDENSING TYPE | 2 | |
| NONE | NA | |
| AIR COOLED | AC | |
| REMOTE CONDENSING | RC | |
| WATER COOLED | WC | |
| CHILLED WATER | CW | |
| SPLIT SYSTEM | SS | |
| HOT WATER | HW | |
| CONDENSING FAN QTY# | 1 | 1:12 |
| NONE | 0 | |
| ONE | 1 | |
| TWO | 2 | |
| THREE | 3 | |
| CONDENSING FAN HP# | 4 | 1:13 |
| CONDENSING FAN FLA# | 4 | 2:14 |

| OPTIONS | CODESTRING | LOOKUPCODE |
|---|---|---|
| COMPRESSOR 1 QTY# | 1 | 1:12 |
| COMPRESSOR 1 TONS# | 4 | 1:16 |
| COMPRESSOR 1 FLA# | 4 | 2:17 |
| COMPRESSOR 1B QTY# | 1 | 1:12 |
| COMPRESSOR 1B TONS# | 4 | 1:19 |
| COMPRESSOR 1B FLA# | 4 | 2:20 |
| COMPRESSOR 2 QTY# | 1 | 1:12 |
| COMPRESSOR 2 TONS# | 4 | 1:22 |
| COMPRESSOR 2 FLA# | 4 | 2:23 |
| COMPRESSOR 2B QTY# | 1 | 1:12 |
| COMPRESSOR 2B TONS# | 4 | 1:25 |
| COMPRESSOR 2B FLA# | 4 | 2:26 |
| DAMPERS<br>NONE<br>OUTSIDE AIR<br>RETURN AIR<br>OUTSIDE AND RETURN AIR | 2<br>NA<br>OA<br>RA<br>OR | |
| GAS HEAT<br>NONE<br>YES | 2<br>NA<br>GH | |
| GAS HEAT CONTROL<br>NO CONTROL<br>2-STATE<br>MODULATING | 2<br>NC<br>TS<br>MD | |
| ELECTRIC TEMPERING COIL<br>NONE<br>SCR CONTROL | 2<br>NA<br>SC | |
| GAS HEAT FURNACE QTY# | 1 | 1:29 |
| ELECTRIC HEAT<br>NONE<br>YES | 2<br>NA<br>EH | |
| ELECTRIC HEAT kW# | 1 | 1:33 |
| HEAT RECOVERY<br>NONE<br>ENTHALPY WHEEL NO SENSOR<br>ENTHALPY WHEEL WITH ROTATION SENSOR<br>FLAT PLATE HEAT EXCHANGER WITH BYPASS DAMPER<br>FLAT PLATE HEAT EXCHANGER WITH MODULATING BYPASS DAMPER | 2<br>NA<br>EH<br>ER<br>FB<br>FM | |
| ENTHALPY WHEEL PHASE<br>SINGLE PHASE<br>THREE PHASE | 1<br>ST<br>T | |
| ENTHALPY WHEEL HP# | 4 | 35:36 |
| ENTHALPY WHEEL FLA# | 4 | 2:37 |
| COMPRESSOR CRANKCASE HEATER<br>NONE<br>CRANKCASE HEATER | 1<br>N<br>H | |
| GFCI OUTLET<br>NONE<br>GFCI OUTLET<br>GFCI TRANSFORMER IN SEPARATE ENCLOSURE | 1<br>N<br>G<br>T | |
| HEAT PRESSURE CONTROL<br>NONE<br>YES | 1<br>N<br>Y | |
| LOW AMBIENT CONTROL<br>NONE<br>YES | 1<br>N<br>Y | |
| STRIP HEATER<br>NONE<br>STRIP HEATER IN PANEL | 1<br>N<br>H | |
| ENCLOSURE COOLING<br>NONE<br>COOLING FAN IN PANEL | 1<br>N<br>C | |
| UV LIGHT<br>NONE<br>YES | 1<br>N<br>L | |

*FIG. 4B-2*

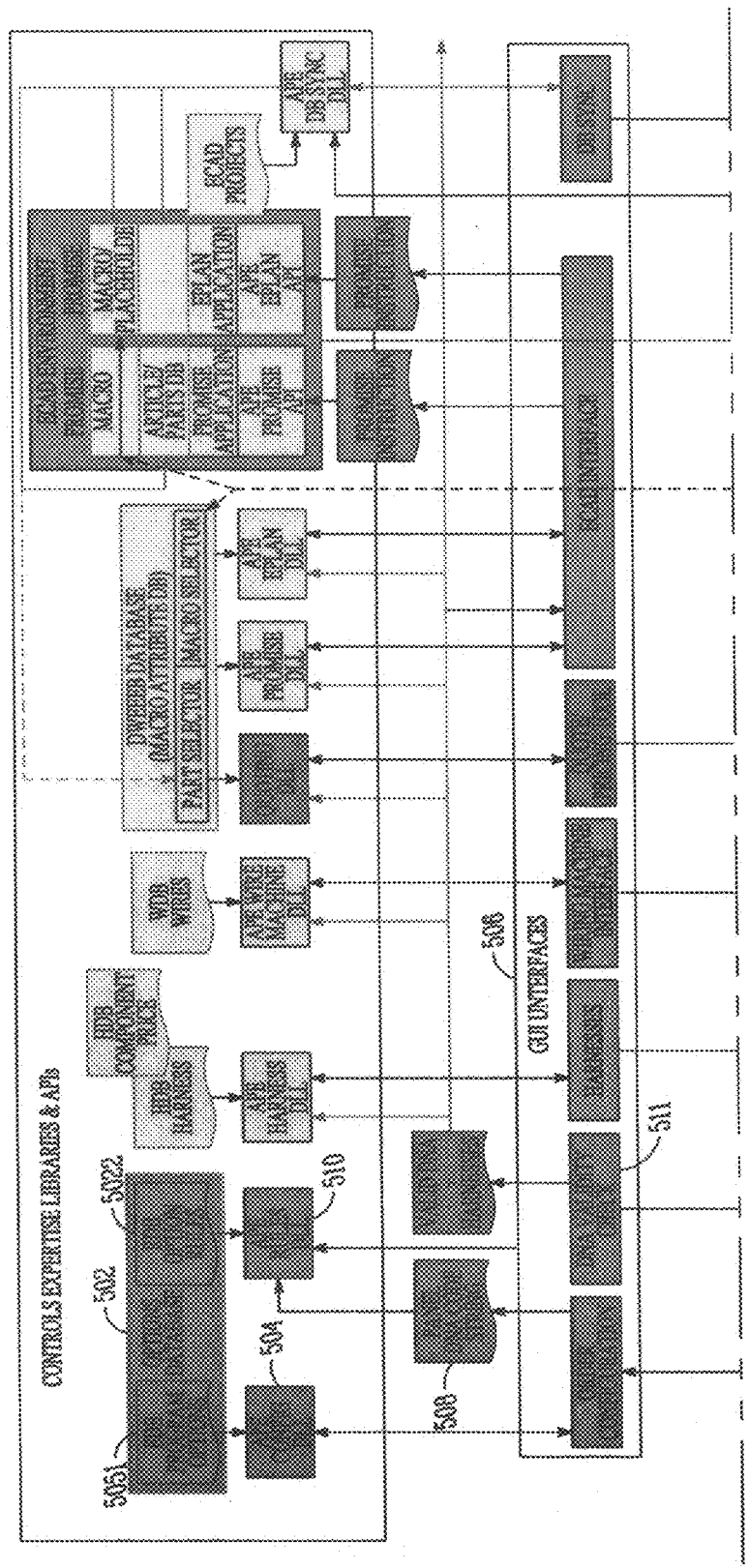

EXEMPLARY
EDB PROGRAM OPTIONS GUI

| | A | B | C | D | E | F | G |
|---|---|---|---|---|---|---|---|
| 18 | 2 | VOLTAGE-PHASE-FREQUENCY | 3 | | | | |
| 19 | 2a | 200(208)V - 3PH - 60Hz | 203 | | | | |
| 20 | 2b | 230(240)V - 3PH - 60Hz | 233 | | | | |
| 21 | 2c | 460(480)V - 3PH - 60Hz | 463 | | | | |
| 22 | 2EOL | | | | | | |
| 23 | 3 | DISCONNECT | 1 | | | | |
| 24 | 3a | NONE (POWER BLOCK) | N | | | | |
| 25 | 3b | NON-FUSED DISCONNECT | D | | | | |
| 26 | 3c | FUSIBLE DISCONNECT | F | | | | |
| 27 | 3d | CIRCUIT BREAKER | C | | | | |
| 28 | 3EOL | | | | | | |
| 29 | 4 | SUPPLY FAN QUANTITY | 1 | | | | |
| 30 | 4a | ONE | 1 | | | | |
| 31 | 4b | TWO | 2 | | | | |
| 32 | 4EOL | | | | | | |
| 33 | 5 | SUPPLY FAN CONTROL | 1 | | | | |
| 34 | 5a | VFD | V | | | | |
| 35 | 5b | MOTOR STARTER | S | | | | |
| 36 | 5EOL | | | | | | |
| 37 | 6 | SUPPLY FAN HP | 4 | | | | |
| 38 | 6a | 1/3 HP | 00.3 | | | | |
| 39 | 6b | 1/2 HP | 00.5 | | | | |
| 40 | 6c | 3/4 HP | 00.8 | | | | |
| 41 | 6d | 1 HP | 01.0 | | | | |
| 42 | 6e | 1.5 HP | 01.5 | | | | |
| 43 | 6f | 2 HP | 02.0 | | | | |
| 44 | 6g | 3 HP | 03.0 | | | | |
| 45 | 6h | 5 HP | 05.0 | | | | |
| 46 | 6i | 7.5 HP | 07.5 | | | | |
| 47 | 6EOL | | | | | | |
| 48 | 7 | SUPPLY FAN FLA# | 4 | 2:6 | | | |

FIG. 6

EXEMPLARY RULES DATABASE STRUCTURE

SYSTEMS, METHODS, AND SOFTWARE FOR AUTOMATED DESIGN AND MANUFACTURING OF HVAC CONTROL PANELS

RELATED APPLICATION

The present application claim priority to U.S. Provisional Application 60/963,747, which was filed on Aug. 6, 2007. This application is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2007, Design Ready Controls, Inc.

TECHNICAL FIELD

Various embodiments of the present invention concern automated design and manufacture of equipment control panels, such as control panels for heating ventilation and air conditioning (HVAC) equipment. Some embodiments also concern control panels and other subassemblies, such as wiring harnesses, for the design and manufacture of pumps, large compressors, conveyors, packaging, and air-handling equipment.

BACKGROUND

Equipment, such as HVAC equipment, is manufactured by Original Equipment Manufacturers (OEMs) which have a variety of customers with differing needs. To meet these needs efficiently, OEMs develop semi-custom product lines, or product families, for particular market segments. Customers then select among various lists of parameters, configurations, and options of the product family to order semi-customized equipment in much the same way as automobile buyers customize their automobiles by choosing among available options.

For example, an HVAC equipment customer might choose among parameters, such as cooling capacities and electrical supply voltages, and among configurations, such as numbers and sizes of supply and exhaust fans. By selecting particular parameters, configurations, and options, the customer is ultimately choosing a single product from thousands or even millions of unique possibilities.

Once the HVAC customer has committed to its selections by placing an order, an HVAC OEM typically completes the order using an ETO (Engineer To Order) process. Specifically, this process entails passing the order to a team of engineers, who study the selections and adapt or customize a generic electrical and mechanical design to incorporate the customer selections. Among other things, this customization effort frequently requires redesigning the electrical control panel of the HVAC equipment.

However, one problem recognized by the current inventors is that conventional control panel redesign is particularly time consuming and expensive because the control panel functions as the brains of the HVAC equipment, and includes hundreds of interconnected components. This added time and expense places significant pressure on OEMs to limit the range of options they offer customers in a market where many customers are actually wanting more options and lower pricing.

Moreover, because of this timing and pricing pressure, many OEMs have sought to shorten the conventional design and manufacture process by skipping steps such as fully documenting their control panel designs with accurate as-built drawings. However, the lack of these drawings creates the further problem of making it difficult to service and troubleshoot HVAC equipment after installation.

Accordingly, the present inventors have identified a need for better ways of designing and manufacturing OEM equipment generally, and HVAC control panels particularly.

SUMMARY

To address this and/or other needs, the present inventors devised, among other things, systems, methods, and software that radically simplify and reduce the time necessary to specify, design, manufacture, and document control panels for semi-custom or even fully custom OEM equipment, such as control panels and wiring harnesses for HVAC equipment. One exemplary computerized system includes a product-configuration module, a technical-design module, and a manufacturing module.

In operation, the product-configuration module receives user input about product family parameters through a specialized configuration interface, and outputs a product family data structure, for example a coded character string analogous to human DNA, to the technical-design module. The technical-design module, which incorporates engineering design rules, automatically processes the coded character string, outputting true as-built engineering drawings, component listings, wiring listings, and even assembly instructions for robotic manufacturing equipment. The manufacturing module receives output of the technical-design module, generates and orders parts using an enterprise resource planning system, and communicates assembly instructions to robotic manufacturing equipment.

The exemplary system dramatically reduces the product specification and engineering time required for any custom control panel and makes it possible for OEMs to efficiently offer more options and shorter turn-around times to its customers and thus enjoy a significant competitive advantage.

BRIEF DESCRIPTION OF DRAWINGS

The patent or application file contains at least one drawing executed in color. Copies of this patent or patent application publication with color drawings(s) will be provided by the Office upon request and payment of the necessary fee.

FIG. 4A is a tabular rendition of an exemplary control panel DNA data structure which corresponds to one of more embodiments of the present invention.

FIG. 4B is a tabular rendition of an exemplary option-to-coded-string translation table corresponding to one or more embodiments of the present invention.

FIG. 6 is a facsimile of exemplary graphical user interface 600 corresponding to one or more embodiments of the present invention.

DETAILED DESCRIPTION OF EXEMPLARY EMBODIMENT(S)

This description, which incorporates the Figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Overview

The exemplary system and method embody a unique approach to the design and manufacture of control panels for custom OEM (original equipment manufacturer) products, particularly custom HVAC equipment. Conventionally, OEMs develop and offer families of products that address particular market segments. For example, OEM's that produce HVAC equipment typically offer a family or range of products. Within a product family, OEM customers choose from a relatively large number of options. Within each product family, millions of permutations or potentially unique option combinations are generally possible. Because of this variability in product configuration, each OEM product ordered is considered to be at least somewhat unique or custom in terms of content and design.

To bring a highly variable product family to market, an OEM typically operates as follows:
1) Recognize a market opportunity.
2) Define specifications for a product family that meets the opportunity.
3) Detail and design engineering for the product family
4) Provide list of options for customers to choose from
5) Finalize the design and layout as each individual order is received (ETO engineer to order process)
6) Manufacture, test and deliver product to customer specifications.

Development of the controls subsystem or control panel for the product family follows the same process, specifically steps 2-6.

The exemplary control panel design and manufacturing system streamlines the upfront development of control panels for such OEM product families (steps 2, 3 and 4), automates the ETO process (step 5), and provides the manufacturing information and reports necessary for the just-in-time mass production of custom controls panels for OEM products (step 6).

Exemplary Control Panel Design and Manufacturing System

Figure 1:
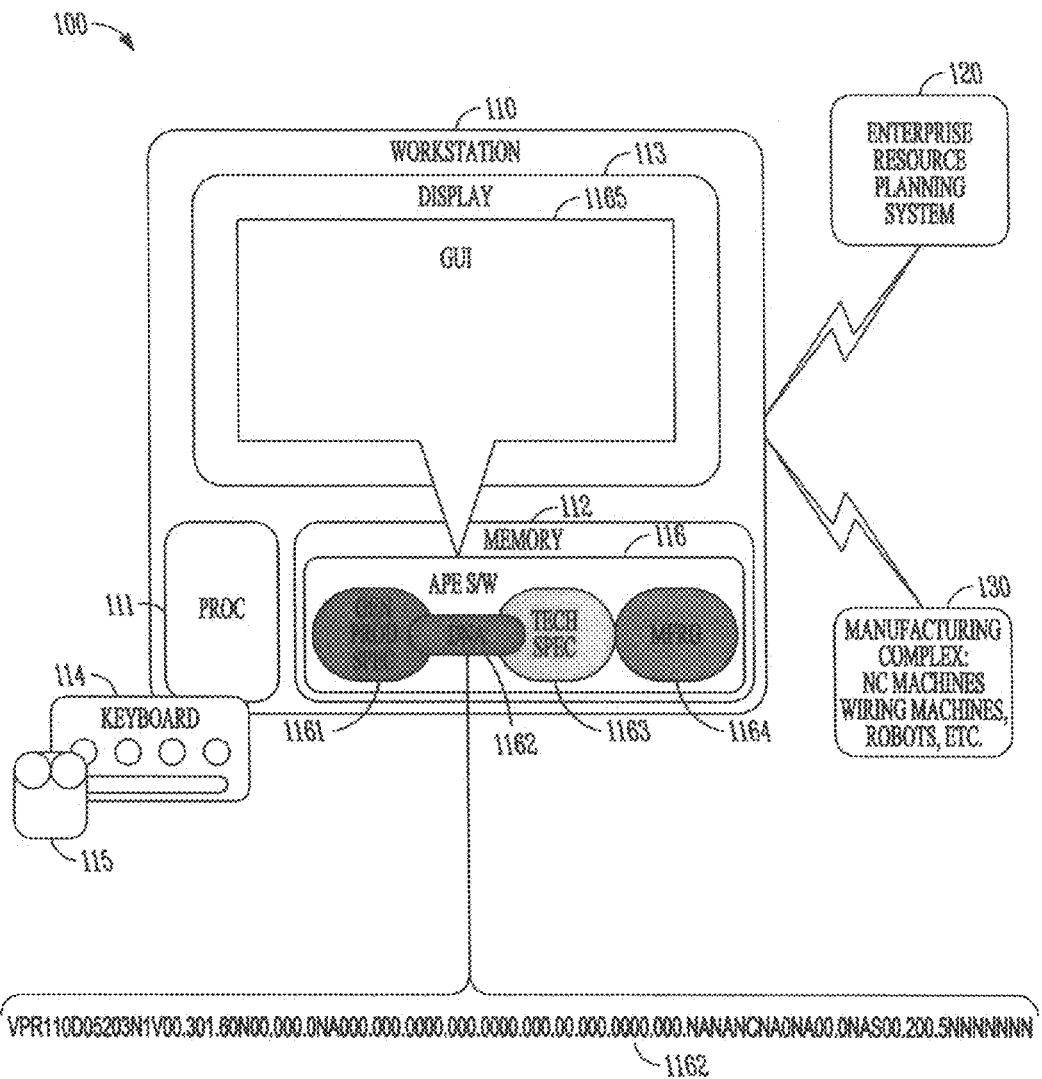
FIG. 1 is a block diagram of an exemplary control panel design and manufacturing system 100, which corresponds to one or more embodiments of the present invention.

FIG. 1 shows an exemplary control panel design and manufacturing support system 100. System 100 includes a computer workstation 110, an enterprise resource planning (ERP) system 120, and a manufacturing complex 130. In the exemplary embodiment, access device 110 takes the form of a personal computer, laptop computer, personal digital assistant, mobile telephone, or any other devices capable of supporting the functionality described herein. Specifically, workstation 110 includes a processor module 111, a memory 112, a display 113, a keyboard 114, and a graphical pointer or selector 115.

Processor module 111 includes one or more processors, processing circuits, or controllers. In the exemplary embodiment, processor module 111 takes any convenient or desirable form. Coupled to processor module 111 is memory 112.

Memory module 112, which takes the exemplary form of one or more electronic, magnetic, or optical data-storage devices, stores automated panel expert (APE) design and manufacturing module 116.

Module 116, which includes machine readable and/or executable instruction sets and related data, includes a general product specification module 1161, a product definition data structure 1162, technical specification module 1163, manufacturing support module 1164, and associated graphical user interfaces 1165.

General product (control panel) specification (or configuration) module 1161 includes instruction sets and data for producing one or portions of graphical user interface (GUI) 1165, accepting user input related to attributes of an HVAC system, and defining and outputting general product specification data structure (DNA) 1162 based on the selected attributes or on imported attributes or requirements. In the exemplary embodiment, general product specification data structure takes the form of an encoded text string, which is validated based on options-compatibility rules. DNA 1162 is output to technical specification module 1163.

Technical specification module 1163 decodes DNA 1162 into various fields or segments. These segments are used in automatically selecting components and defining mechanical and electrical schematics for a product, such as an HVAC control panel, using design rules and macros for computer-aided-design tools.

Manufacturing module 1164, which receives the mechanical and electrical schematics, includes instructions sets and data for not only defining one or more portions of GUI 1165, such as ECAD interfaces, but also defining wiring lists, mechanical layouts, ERP order administration, etc.

In addition to workstation 110, system 100 includes ERP system 120 and manufacturing complex 130, both of which interface with manufacturing module 1164 to facilitate just-in-time mass production of HVAC control panels and associated wiring harnesses.

Exemplary Method of Operation

Figure 2:
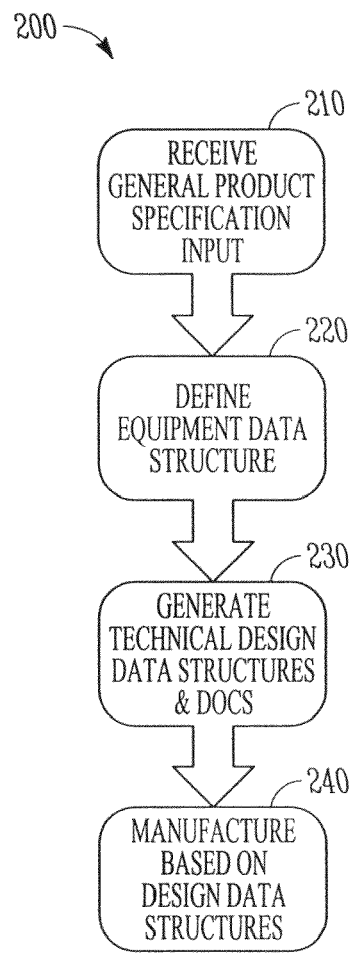
FIG. 2 is a flow chart of an exemplary method of operating system 100, which corresponds to one or more embodiments of the invention.

FIG. 2 shows a flowchart of an exemplary method 200 of operating a system 100 in FIG. 1. Flow chart 200 includes blocks 210-240, which are arranged and described serially. However, other embodiments execute two or more blocks in parallel using multiple processors or processor-like devices or a single processor organized as two or more virtual machines or sub processors. Other embodiments also alter the process sequence or provide different functional partitions or blocks to achieve analogous results. Moreover, still other embodiments implement the blocks as two or more interconnected hardware modules with related control and data signals communicated between and through the modules. Thus, the exemplary process flow applies to software, hardware, and firmware implementations.

Figure 3:
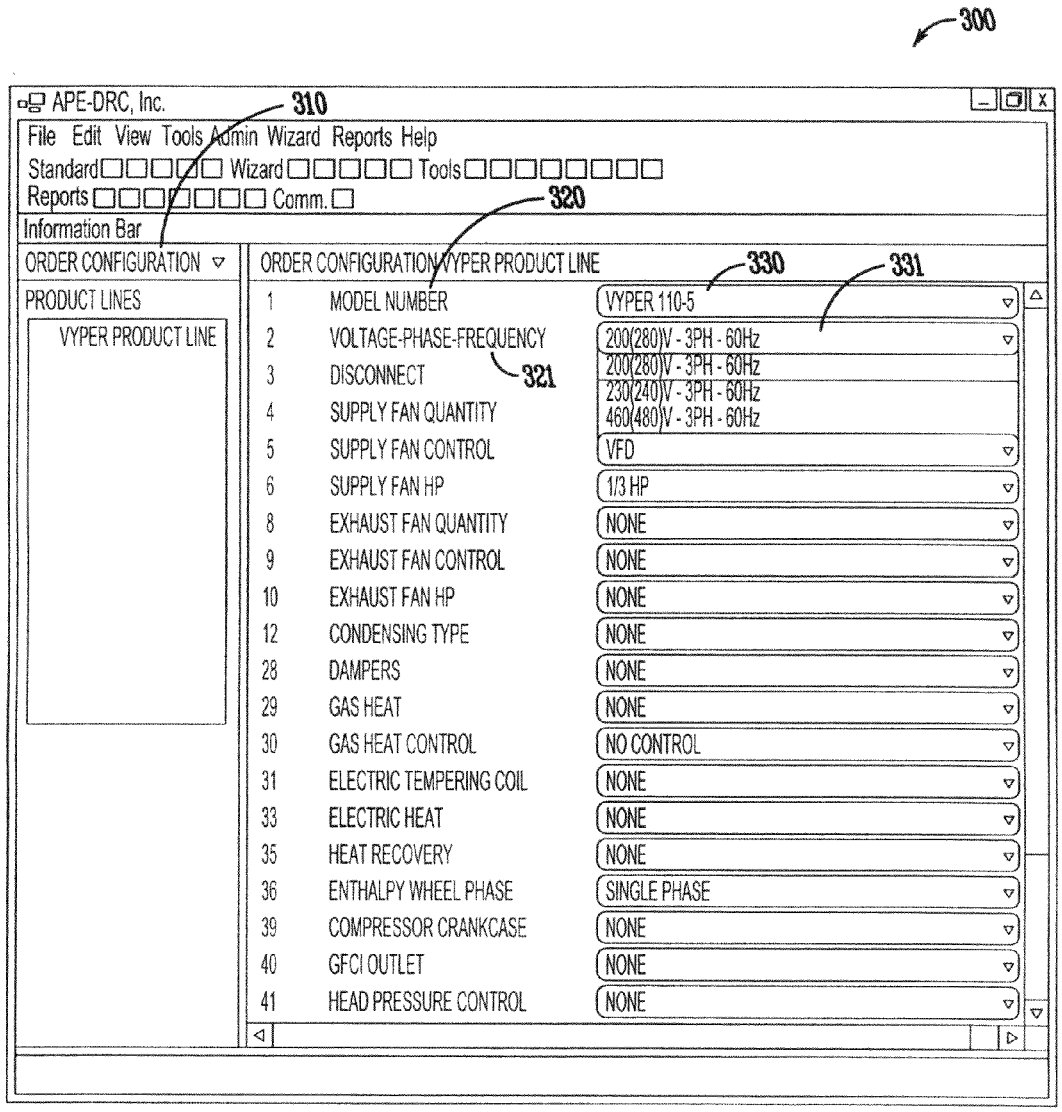
FIG. 3 is a facsimile of exemplary graphical user interface 300 corresponding to one or more embodiments of the present invention.

The exemplary method begins at block 210, which entails receiving input defining a set of product options. In the exemplary embodiment, this entails displaying a product definition or configuration interface portion of GUI 1165 which lists a variety product selection option. FIG. 3 shows an exemplary configuration interface 300.

Configuration interface 300 includes a product line listing region 310, a feature listing region 320, and a corresponding feature definition region 330. Product line listing region lists one or more selectable product lines. Feature listing region 320 lists a set of features or attributes, such as voltage-phase-frequency attributes 321, which associated with the active or selected product line within region 310. Feature definition region 330 includes a set of feature definition regions, such as pull-down menu 331, which corresponds to the voltage-phase-frequency attributes 321. Pull-down menu 331 lists selectable options. Execution continues at block 220.

Block 220 entails defining an equipment data structure based on the selected product options. In the exemplary embodiment this entails defining a DNA data structure in the form of a coded text string based on the selections made using configuration interface portion of GUI 1165 or interface 300.

FIG. 4A shows a tabular rendition of an exemplary DNA data structure 400, which includes 45 data fields, each associated with a particular user-selected or otherwise defined OEM product option, such as an OEM HVAC system. In the exemplary character-string implementation, each data field is associated with a position within the character string and has a predetermined number of characters representative of some aspect of an OEM HVAC system that affects its control panel (and wiring harness.) For example, data field #1 is 9 characters long and defines the model number of the HVAC system; data field #2 is 3 characters long and defines some aspect of the voltage-phase-frequency of the HVAC system with the selected model number; data field #3 defines some aspect of the HVAC disconnect and has a length of one character. In the exemplary embodiment, the data field number also indicates its cardinal position within a concatenated text string.

In defining the DNA structure based on the selected options, the exemplary embodiment uses a translation data structure or table. FIG. 4B shows an exemplary translation data structure 450, which is stored in memory of the exemplary system. Translation data structure 450 includes options 452, code strings 454, and lookup codes 456. In the exemplary system, one or more of the user selections for the configuration menu is calculated based on other selected parameters or selected from a lookup table using a lookup coding scheme that either addresses a predetermined value or a formula for determining a value. (In the exemplary embodiment, DNA coding table 450, implemented as a spreadsheet or database, is also used to define the content and sequencing of menus and menu listings in the configuration interface. Thus, changing the position of the model number options within the spreadsheet changes its position within interface 300.) An exemplary control panel DNA data structure follows:

```
VPR110D05203N1V00.301.60N00.000.0NA000.000.0000.
  000.0000.000.00.0000.000.0NANANCNA00.0NAS00.200.
                                           5NNNNNNN
```

The exemplary method also entails validating the DNA data structure using validation rules, specifically ensuring that the selected options presented in the DNA data structure are compatible based on options rules. Some embodiments perform validation during general product specification on a selection-by-selection basis, alerting the user whenever a given selection is incompatible with a prior selection, or alternatively narrowing the available feature space as the user moves through the configuration interface.

FIG. 2 shows that after defining an equipment data structure based on the selected product options, execution continues at block 230.

Block 230 entails automatically generating technical design data structures and documentation based on the defined (and validated) equipment data structure (which is representative of the general product specification.) In the exemplary embodiment, this generally entails defining a parts lists based on the DNA data structure, generating electrical and mechanical schematics based on ECAD macros for the parts and related macro attributes logically associated with parts and one or more portions of the DNA data structure, such as model number or product line.

Block 240 entails automatically manufacturing a piece of equipment, in this case a control panel, based on the technical design data structures. In the exemplary embodiment, manufacturing entails defining wiring lists, mechanical layouts, etc. and communicating relative instructions sets to one or more automated or robotic manufacturing devices, such as wiring machine, laser cutter, or milling machine, to complete the desired control panel. Additionally, automated testing is performed.

Further structural and operational details are described below in relation to an exemplary software architecture.

Exemplary Software Architecture

Figures 2, 5A:
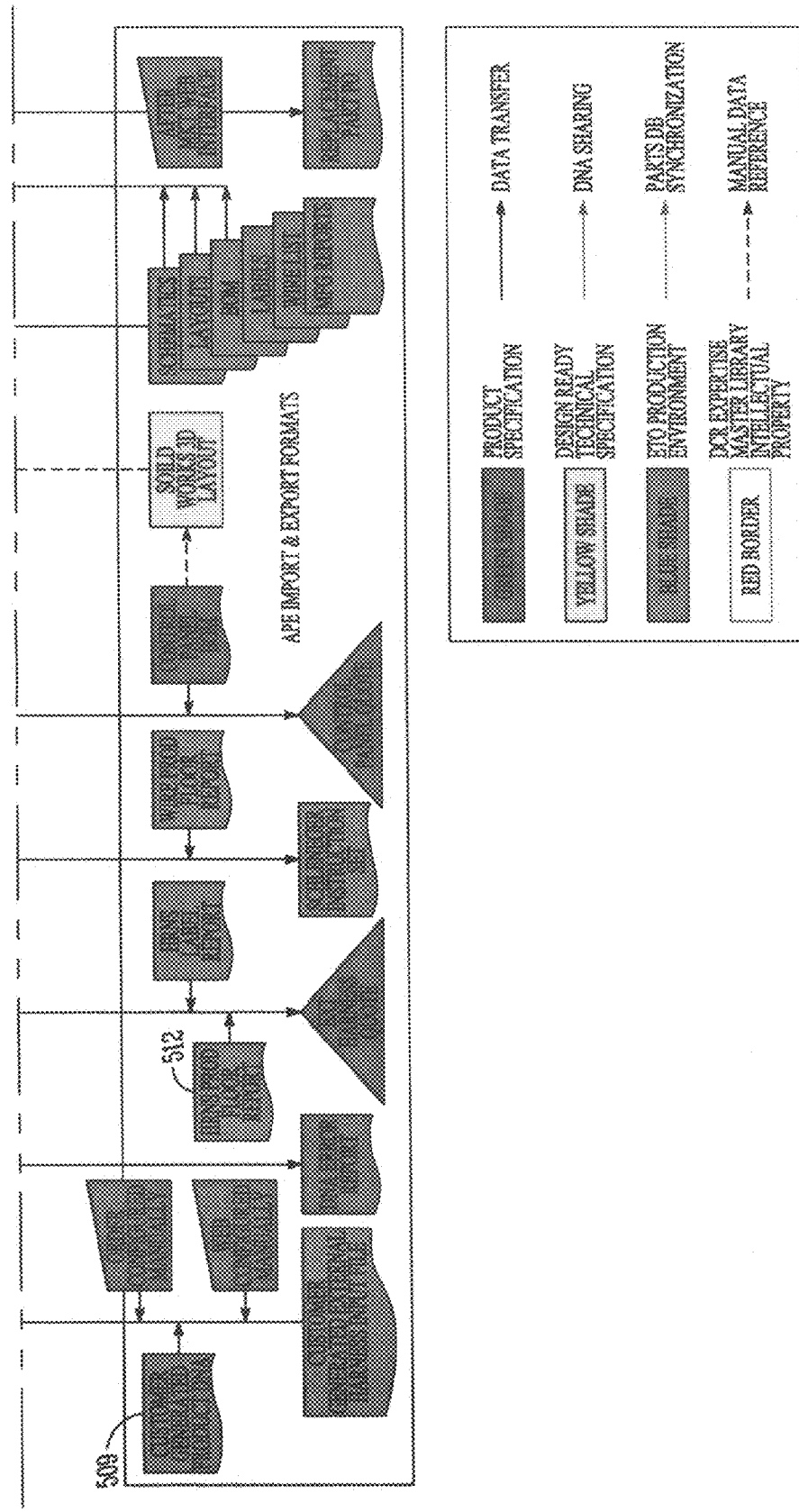
FIGS. 5A and 5B are combination flow and block diagrams, which taken together, represent an exemplary architecture 500 that corresponds to one or more embodiments of the present invention.
Figure 5B:
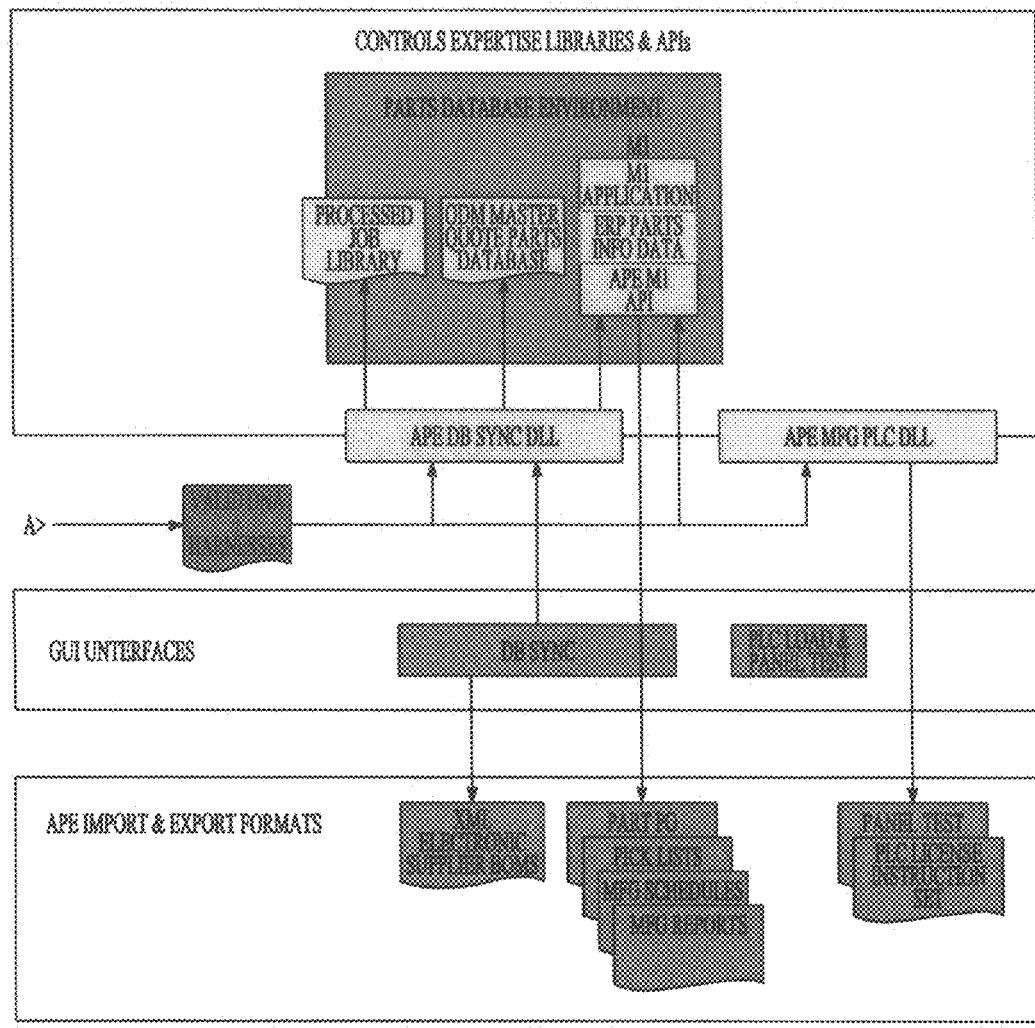

FIGS. 5A and 5B shows an architectural block and flow diagram of an exemplary implementation 500 of software 116 in FIG. 1. These two figure shows three sets of color coded components, with the green components generally corresponding to module 1161, the yellow components corresponding to module 1163, and the blue components corresponding to module 1164. Flow through the diagram is generally left to right.

General Product Specification

In operation, the exemplary method starts with presenting a "design ready" list of common technical options (EDB PROGRAM OPTIONS 202) found within an OEM industry such as HVAC, pump, large compressor, conveyor, packaging or air handling etc. For example, an HVAC OEM can select options for a range of supply fans based on horsepower. (FIGS. 3 and 4 shows respective graphical user interfaces 300 and 400 for selecting options.)

By choosing from this list of options and limiting the available selections within each option, the OEM can use the exemplary system to quickly define and generate the general engineering specifications for a product family (Step 2 in Overview). In the exemplary embodiment, the OEM can further develop the engineering product family specifications by adding to this list any additional options that may be unique to its offering.

Because the system helps reduce the time and cost of upfront product development (Step 3) and ETO (step 5), OEMs are often able to economically expand the number and variety of product family options (EDB PROGRAM OPTIONS 2021). Once a set of options is defined, the system defines a DNA code string or data structure 208 (analogous to DNA 1162 in FIG. 1) that effectively captures the customized order from the OEM's customers.

More specifically, in the exemplary embodiment, an APE CONFIG DLL module 503, reads the original engineering specifications from an OPTIONS DATABASE 502 and automatically defines a Control Panel DNA data structure 508) for the product family.

To capture an order, the exemplary system configures the EDB PROGRAM OPTIONS preselected by an OEM into a dynamic GUI interface list, such as GUI 300 in FIG. 3 This GUI is used for manually configuring orders (Step 4) through the selection of control panel options (ORDER CONFIGURATION, ORDER CONFIGURED MANUALLY). Selection listed in the GUI 300 are populated from an EDB program options database 5051. FIG. 6 shows that the EDB program options database can take the form of an Excel spreadsheet; however, some embodiments use a SQL database format.

The EDB program options database contains the list of options or parameters that are used to define translation table in FIG. 4B, which as noted earlier to translate selected equipment options into the DNA code string for a control panel. Some of these options are displayed dynamically through the configuration interface in FIG. 3 when someone configures a control panel. These are the options highlighted in yellow in FIG. 4. The ones highlighted in orange/tan are calculated on the fly or using lookup tables kept in other Microsoft Excel spreadsheet files. In many cases, the user need not be prompted. For example, the exemplary embodiment calculates amperage if we prompt for voltage and horsepower. In this case, the DNA strand will show horsepower, voltage and amperage even though we only prompted the user for horsepower and voltage. All of the parameters are used to complete the fields in the DNA strands. EDB files are fully customizable for each individual customer's control panel requirements The exemplary system offers a unique link between how a customer views requirements and how these requirements translate into a set of engineering specifications in the form of a PANEL DNA CODE STRING. For example, a customer may view a requirement as the need for an HVAC system for a 25,000 sq. ft. warehouse, and the exemplary system ultimately translates this into an engineering requirement of an HVAC system having 4 units of a specified capacity with each unit having 5 hp supply fans.

The exemplary system presents options to a customer in a menu using customer friendly language and then uses RDB OPTIONS RULES 5022 within OPTIONS DATABASE 502 to translate or map the customer requirements into the engineering requirements. For example, the system can query a customer for the size of warehouse they need air conditioned and in response select an appropriate quantity and product recommendation based on model number. From the model number, the exemplary system provides further rules to select more detailed engineering criteria such as supply fan horsepower etc. This automated translation from customer requirements to engineering specifications enables the OEM to quickly identify customer requirements and instantly provide customized engineering specifications including quotes and bills of material (BOMs).

In exemplary embodiment, APE CONFIG DLL 504 used to map customer requirements and configure orders into Panel DNA code string 508 can also be embedded or called directly from an OEM's internal order entry software as represented by CUSTOMER GENERATED PRODUCT DNA 509. The APE GUI interface can be hosted on a web server to define a WEB CONFIGURED ORDER 510, allowing OEM customers to order products from anywhere via a wide- or local-area network.

To detect and allow correction of compatibility issues between selected options, APE RULES.DLL 510 reads the list of options selected within PANEL DNA CODE STRING 508 and dynamically checks for errors and option incompatibilities, using engineering rules within RDB OPTIONS RULES database 5022 to validate each potential order. DNA VALIDITY CHECK interface 511 is used in concert with the ORDER CONFIGURATION interface 506 to guide OEM sales personnel and their potential customers through the order configuration process. (In some embodiments, the APE RULES.DLL can also be used in concert with and be directly called from an OEM's internal order-entry software tool.)

Figure 7:
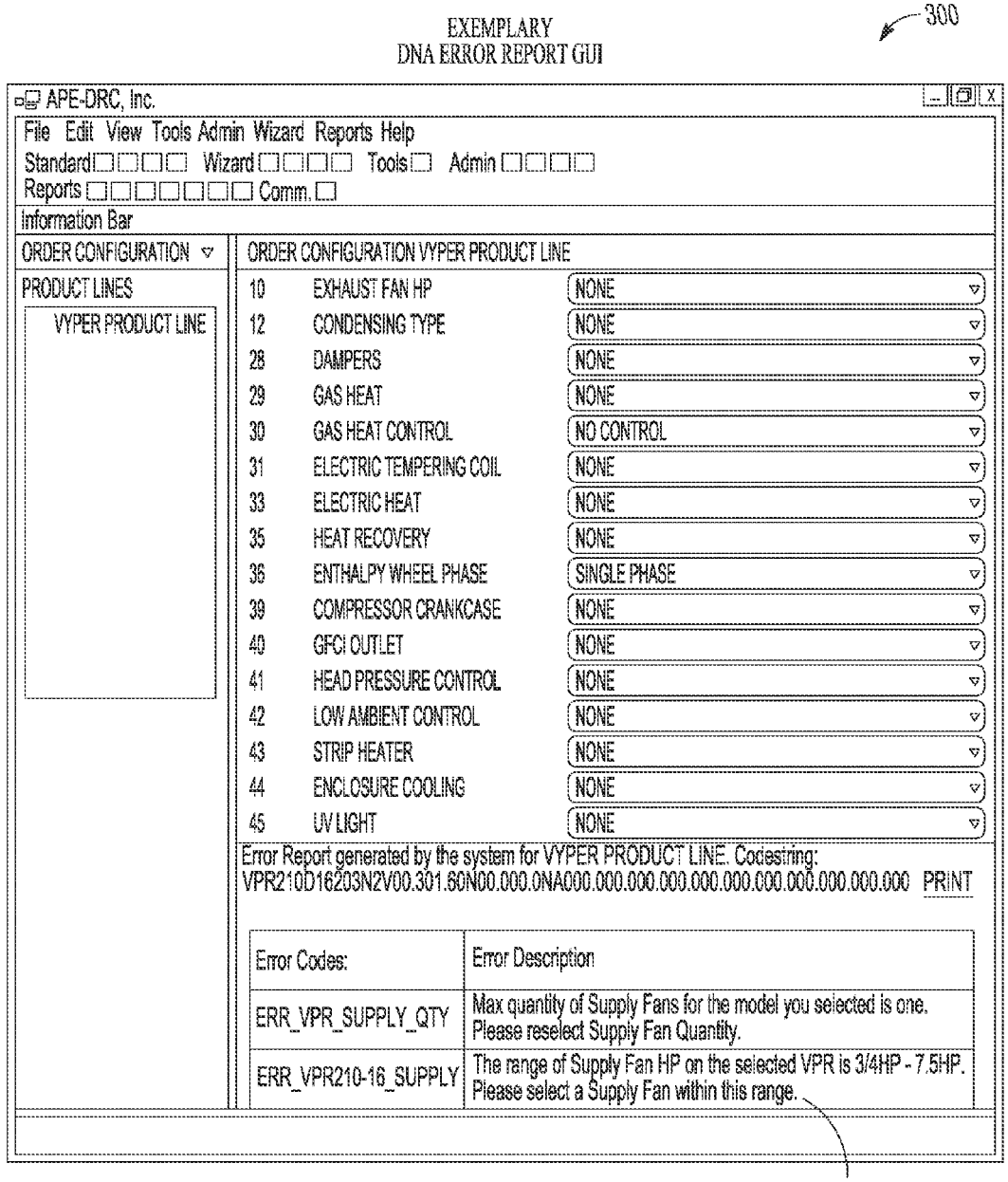
FIG. 7 is a facsimile of exemplary graphical user interface 700 corresponding to one or more embodiments of the present invention.

More specifically, RDB OPTIONS RULES database 5022 includes a series of if/then Boolean operations that point to fields in the PANEL DNA CODE STRING. For example if field one equals 30 (which could stand for a model number 30 pump control) then perhaps field 2 cannot be X, Y, or Z (which could represent certain types of disconnects). Each rule violation points to an error message that can be dynamically displayed to the user as a DNA ERROR REPORT 512 from the DNA VALIDITY CHECK interface 512. For example; "Error you cannot have a type X, Y or Z disconnect in a model 30 product." FIG. 7 shows an exemplary DNA error report GUI 700 (300), with an error message region 710.

Figure 8:
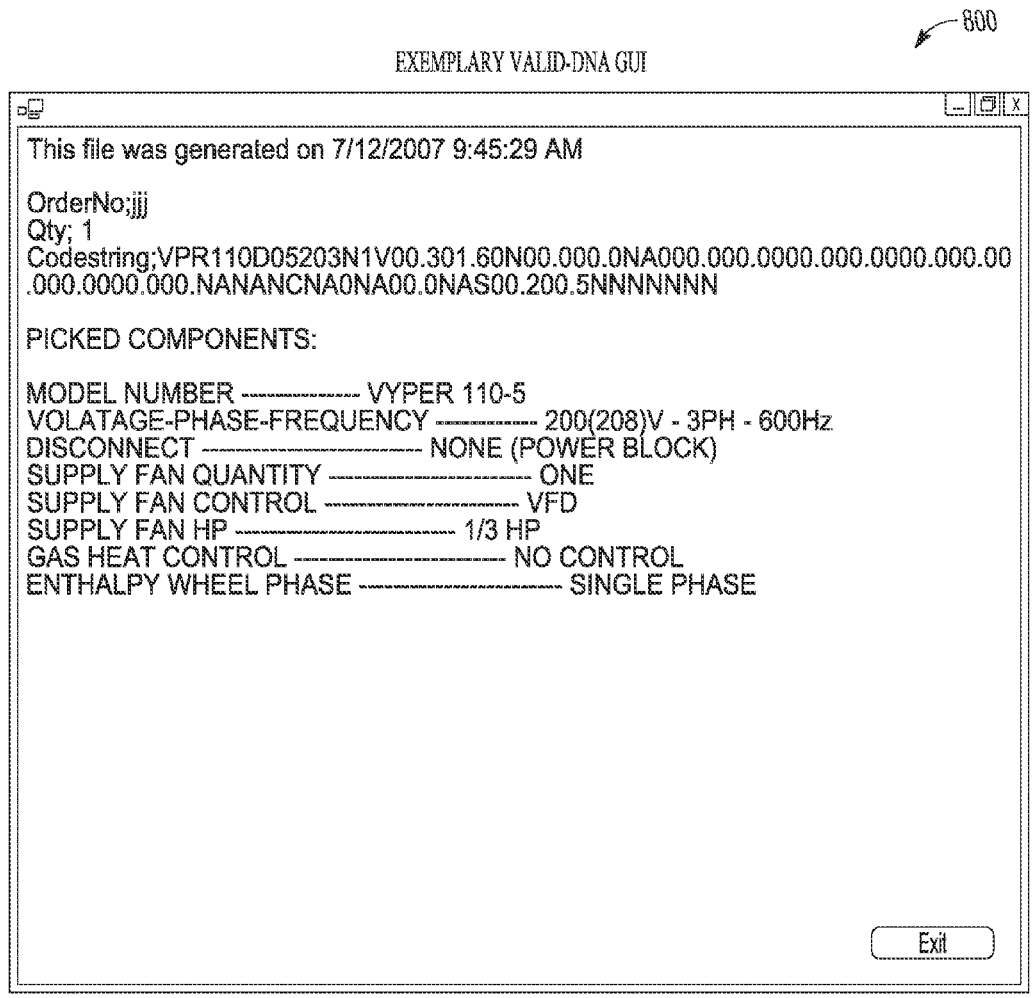
FIG. 8 is a facsimile of exemplary graphical user interface 800 corresponding to one or more embodiments of the present invention.

When APE RULES.DLL 510 determines that all the rules in RDB OPTION RULES database 5022 have been met for a particular order defined by PANEL DNA CODE STRING 508, it validates the DNA code string and clears the order, now captured in the VALID DNA format, for use with the automated ETO processing tools. FIG. 8 shows an exemplary valid DNA GUI 800 that is output in response to a validity confirmation.

Figure 9:
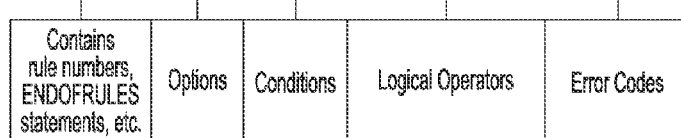
FIG. 9 is a facsimile of exemplary graphical user interface (and database structure) 900 corresponding to one or more embodiments of the present invention.

FIG. 9 shows an exemplary spreadsheet version 900 of RDB option rules database 5022. The rules are set up as complex sets of IF-THEN statements of the form IF (DNA code (=, <, >, etc) some calculated value) THEN (select size, part, macro, wire, etc). (Rules of this form can also be created and managed using off-the-shelf applications such as Rules Stream expert-system software.)

These are the rules that are executed against a DNA code string. In some cases the rules describe DNA code compatibility and which options may or may not work with others. In this case they are used in the DNA error checking routines that validate a desired configuration or DNA code string. In other instances these rules are used to select and size components that go into a control panel. For example if the DNA code for hp=30 then a motor starter of a certain size from a particular vender will be selected. When we use the RDB format for such selections we sometime refer to the file as a DWEEEB database.

DETAILED TECHNICAL DESIGN SPECIFICATION

The upfront engineering of the controls for an OEM family of products typically involves creating the following:

A) A series of general yet detailed electrical schematics that cover the options and basic controls functions necessary for the OEM product family.

B) A complete list of all the components and parts that are potentially needed to complete the control panels for an entire OEM product family.

C) A detailed scheme for the physical layout, of the parts from step B, for the family of control panels.

The exemplary process and software tools are designed to help streamline the upfront detailed design process (Steps A, B & C) and automate the ETO process. The exemplary system automates the process in such a way that the detailed design information from steps A, B and C are captured (MACRO OBJECT DR, APE MASTER ENGINEERING PARTS DB and MACROS along with ETO engineering or decision making expertise (DWEEEB database with electrical engineering and estimating brains DATABASE) within the system. The system incorporates off-the-shelf, 3D solid-modeling applications (SOLIDWORKS 3D LAYOUT) for interference checking and the development of a layout scheme. (Step C).

The detailed design process (steps A, B, C) is therefore streamlined to a standardized process of selecting appropriate generic macros and rules and augmenting them with any additional data necessary to complete the design of the controls for a family of products. (Note: ECAD macros are small schematic or layout drawings that can be picked, placed and linked into complete schematic and layout drawings.) Once populated with the detail design information and ETO rules, the exemplary system completely automates the ETO process and produces as-built schematics, as-built layouts, BOMs, and a host of manufacturing reports for each unique panel at the touch of a button (SCHEMATICS, LAYOUTS, BOM, LABELS, WIRE LISTS, MFG REPORTS).

Automated Manufacturing

In general terms, the exemplary system captures the expertise and criteria used by ETO engineers and processes orders (VALID DNA) with this information. Instead of an engineer handing off marked up schematics to a drafter, the exemplary system uses the APE GUI ECAD INTERFACE, APE (APE PROMISE DLL, APE EPLAN DLL) to create an ECAD instruction set (PROMISE INSTRUCTION SET, EPLAN INSTRUCTION SET) that can be executed through the API (application programming interface) of standard off the shelf ECAD drafting packages (APE PROMISE API, APE EPLAN API). Through the APIs, as-built schematics and layouts can be generated with the touch of a button or via a single command or call from another application. The schematics and layouts are then efficiently checked for errors and completeness utilizing standard utilities available within the ECAD packages (ECAD ENVIRONMENT).

The exemplary system includes a unique populated master parts database (APE MASTER ENGINEERING PARTS DB) that is associated with a unique set of macro information or MACRO OBJECT DATA BASE and a catalog of ECAD macros (MACROS, MACROS/PLACEHOLDER).

Electrical CAD systems such as PromisE, EPLAN or AutoCAD electric use the concept of Macros or sub drawings that can be quickly accessed to build up larger or complete schematics. In addition to the graphical representation, each software vender allows data or attributes to be assigned to a macro. This information can include items such as part numbers of components, wire numbers, wire gauge, wire colors, harness designations, schematic page and X,Y location coordinates, device IDs, connection point labels, wire terminations, strip lengths, wire lengths, etc.

Conventional macros contain this type of attribute information on a product family basis. Thus, conventional macro catalogs normally need to be recreated for each different product family or schematic and layout design. However, the present inventors recognized the inefficiency of this approach and devised a unique MACRO OBJECT DATABASE that captures, maintains and manages ECAD macro attribute information. This allows one to create truly generic catalogs of macros (with generic placeholders for the attribute information) for all off-the-shelf ECAD packages. These generic macros can be used repeatedly across various OEMs and across various product families as well as schematic and layout configurations. Once generic macros are placed, information specific to the product family can be assigned to the macros from the MACRO OBJECT DATABASE.

The benefits and efficiencies of this unique approach are many. The need to redraw and manage macros used for specific product families is reduced. An original design manufacturer can share generic macros across product families and customers reducing upfront development costs. ECAD attribute data is managed independently from any specific ECAD software application, thus allowing the ability to change an APE installation from one ECAD software vender to another. And by managing the attribute data within a sophisticated database utility, such as the Microsoft SQL utility, the data is much easier to maintain, update and revise. And those that maintain this attribute data can do so directly without having to access or even know how to access the ECAD software applications, again reducing engineering time, resources and expertise required for implementing initial installations of the APE system or future engineering changes in a product family.

Associated with each part in the master library and with each macro is a set of rules (DWEEEB DATABASE) that describe what parts and what macros may be selected for any given VALID DNA code string. The rules include a series of if/then Boolean operations, which once satisfied point to a part (PARTS SELECTOR) to be included in the BOM or a macro (MACRO SELECTOR) to be included in the as-built SCHEMATICS or LAYOUTS.

As the APE PROMISE DLL or APE EPLAN DLL processes each rule (DWEEEB DATABASE) against an order (VALID DNA), instruction sets for the picking and placing of macros and the assignment of parts (PROMISE INSTRUCTION SET, EPLAN INSTRUCTION SET) and ECAD attributes are generated as input for the ECAD systems (PROMISE APPLICATION, EPLAN APPLICATION). Through the ECAD APIs, (APE PROMISE API, APE EPLAN API), the instruction sets are automatically executed and as-built drawings, BOMs and manufacturing reports (SCHEMATICS, LAYOUTS, BOM, LABELS, WIRE LISTS, MFG REPORTS) are generated without the need for manual intervention (ECAD INTERFACE). Results are verified within the ECAD ENVIRONMENT and then electronically sent to the appropriate manufacturing group (ECAD INTERFACE).

As-built manufacturing reports (SCHEMATICS, LAYOUTS, BOM, LABELS, WIRE LISTS, MFG REPORTS are archived (PROCESSED JOB LIBRARY) using the APE DB SYNC DLL and DB SYNC interface for future aftermarket and support access (AFTER MARKET WEB INTERFACE, REPLACEMENT PART PO).

The handling of macros is a notable aspect of the exemplary system. In contrast to conventional ECAD systems which bundle macros and macro attributes, the exemplary embodiments effectively separates them, storing product-line-specific macro attributes in a separate database that can be called by the ECAD APIs. The ECAD systems include the drawings macros for relevant components along with their conventional macro attributes; however, when ECAD APIs in the exemplary embodiment call for a particular macro from an ECAD program, they also call for or retrieve a set of product-line-specific macro attributes from the macro attribute database (DWEEEB in FIG. 5A). The conventional macro attributes are ignored or overridden by the ECAD API according to the product-line-specific macro attributes. Thus, in the exemplary embodiment, ECAD macros can be paired with multiple sets of product-specific macro attributes that effectively redefine the macro as necessary to facilitate the production of schematics and as-built drawings for not only multiple product lines of a given OEM, but also across the product lines of multiple OEMs.

The overall advantages to this system includes ETO turnaround times measured in minutes versus days or even weeks, fewer human touches and therefore fewer errors in the drafting process, complete manufacturing and after-market support specifications in the form of as-built drawings, BOMs and manufacturing reports (SCHEMATICS, LAYOUTS, BOM, LABELS, WIRE LISTS, MFG REPORTS), and a system that continually improves through the iterative process of quality control.

Extensions

Pricing Tool Extensions

Pricing information can optionally be added to the master parts list (ERP PARTS INFO DB). Along with PARTS SELECTOR rules, the exemplary system uses a QUOTING DLL and QUOTING/PRICING TOOL GUI interface to calculate and display pricing information (CONTROL PANEL BOM, CONTROL PANEL QUOTE) when the sales organization configures an order (VALID DNA). This capability to generate instant quotes at the time an order is configured for custom control panels is another competitive advantage.

Harness and Wire Processing Extensions

If control panels can be thought of as the brains and the OEM product as the body, then harnesses that connect the brains to the body can be seen as the nervous system. For each potential control panel within an OEM product family, there is a unique set of corresponding harnesses that are required to connect the control panel to the OEM product.

The exemplary system includes a harness parts and pricing rules database (HDB HARNESS, HDB COMPONENT PRICE) that is processed (HARNESSES GUI) with the APE HRNS DLL to create both quotes (EXT HARNESS QUOTE) and manufacturing reports (HRNS PROD FLOOR REPORT, HRNS LABEL REPORT) for the external harnesses. Harness production floor reports may include instruction sets for use with automated wire processing machines.

While most of the harness information can be captured in a design ready format, the lengths of the harnesses are dependant on the size, shape and electrical routing within the ordered OEM equipment. Through the exemplary system, OEMs can choose to include this additional harness information (CUSTOMER GENERATED EXTERNAL HARNESS INPUT FILE) along with the control panel configuration (VALID DNA+HARNESS).

In addition to harnesses data, a set of control panel wire information (WDB WIRES) can also be created for the product family. This set of data/rules is used by the APE WIRE MACHINE DLL to compile a manufacturing wire report (WIRE PRODUCTION FLOOR REPORT) and a set of instructions for an automated wire process machine. The exemplary embodiment supports the Schleneger brand of wire machine (SCHLENEGER INTERFACE, SCHLENEGER INSTRUCTION SET), but the system architecture allows that others such as Komax can added. The use of automated wire processing machines drastically reduces the time to cut, strip, label and terminate wires.

Database Synchronization

The exemplary system manages and synchronizes the databases used through out the specification, detailed design, ETO process and manufacturing process (Steps 2-6) and future aftermarket activities. Through the PARTS DATABASE ENVIRONMENT and the DB SYNC GUI interface, APE establishes industry libraries of design-ready data, manages historic production data, and synchronizes information with internal, supplier and customer order to remittance applications.

The exemplary system also helps differentiate and manage both commercial and engineering data for parts. On the commercial side, the system recognizes a central ERP (enterprise resource planning) system as the source for current parts, pricing and scheduling information (M1 APPLICATION).

While the ERP system specializes in commercial information, there is still a need to manage the engineering data such as part specifications, mounting whole locations, connection point specifications etc. In many cases, the ECAD software applications have proprietary database utilities to manage this type of parts data. Similar to the MACRO OBJECT DATABASE, the exemplary system employs a more generic APE ENGINEERING PARTS DB that can manage generic parts data across multiple product families, customers, vendors and ECAD software applications, all while being seamlessly synchronized with an ERP system.

The exemplary system uses this information (ERP PARTS INFO DATA) to populate and refresh the design ready master libraries (MACRO OBJECT DB, ENGINEERING PARTS DB and DWEEEB DATABASE PARTS SELECTOR). Through the DB SYNC interface, the APE DB SYNC DLL extracts information from the ERP system (APE M1 API), combines this information with the APE ENGINEERING PARTS DB and is makes all necessary data available and accessible by the ECAD ENVIRONMENT, QUOTING TOOLS, MFG REPORTS generation such as BOMs, and aftermarket part selection utilities such as the AFTER MKT WEB INTERFACE.

As orders enter the ETO engineering process, the orders are in parallel managed from a supplier and order-to-remittance perspective. Electronic communication from the exemplary system generates purchase orders (Pos) for components (PART PO) and automatically sends them to suppliers, manages inventories (XML ELECTRONIC SUPPLIER BOMS, PICK LISTS), and coordinates schedules (MFG SCHEDULES, MFG REPORTS) between the manufacturing department and OEM customer.

As jobs are complete through the automated ETO process embodied within the system, manufacturing reports (SCHEMATICS, LAYOUTS, BOM, LABELS, WIRE LISTS, MFG REPORTS) and project data (ECAD PROJECTS) are stored in a PROCESSED JOB LIBRARY. This library can in turn be accessed through the DB SYNC interface for future reference. An additional web portal (AFTER MKT WEB INTERFACE) to this historic project data is available for aftermarket support and the generation of REPLACEMENT PART POs.

Final Test and PLC Logic

The exemplary system also assists in the final programming and testing of the panel before it leaves for the OEM customer. Once the panel is assembled, the APE PLC LOAD AND TEST interface utilizes the APE MFG PLC DLL to download the correct controller instructions (PLC LICENSE INSTRUCTION SET) to the panels PLC (programmable logic controller) and then tests the panel to make sure it is functionally correctly (PANEL TEST). Thus, testing protocols or instructions are dynamically loaded to match the particulars of any given panel under test.

Full Customization

The exemplary system enables "true custom" design and manufacturing by providing for manual interface into the ECAD applications. Specifically, the system can be used to define a semicustom product using the configuration interface to define a product DNA structure and develop a detailed technical design, including ECAD schematics. The ECAD schematics can then be manually modified to include options not available in the configuration interface. Once the schematics are fully customized with these options, they and related BOMs, etc can be generated as with any product defined fully in the configuration interface. This customization process also applies to mechanical layout and enclosure dimensioning and design, with the exception that 2D or 3D modeling software can be used to manually or automatically generate layouts and enclosure designs after determination of electrical schematics and BOMs. The system can process these technical design using its manufacturing and ERP automation as with semicustom designs.

Conclusion

The embodiments described above and in the claims are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. A system comprising:
means, including at least one processor coupled to a memory, for receiving input from an original equipment manufacturer (OEM), defining specifications for a heating ventilation and air conditioning (HVAC) product family;
means, responsive to the received input from the manufacturer and including at least one processor coupled to a memory and a display device, for enabling the OEM to select options for the HVAC product family;
means, responsive to the selected options, for automatically defining at least one HVAC control panel electrical schematic;
means, responsive to the at least one electrical schematic and including at least one processor coupled to a memory, for defining an HVAC control panel mechanical layout; and
means, responsive to data from the at least one HVAC control panel electrical schematic, for defining a bill of materials and outputting pricing information for manufacture of an HVAC control panel.

2. The system of claim 1, further comprising:
means, responsive to electrical and mechanical design data from the at least one electrical schematic for automatically operating at least one piece of computer-controlled machinery for producing at least a portion of the HVAC control panel.

3. The system of claim 2, wherein the at least one piece of computer-controlled machinery includes a wiring machine.

4. The system of claim 2, wherein the at least one piece of computer-controlled machinery includes a laser cutter or milling machine.

5. The system of claim 1, wherein the system further comprises an enterprise resource planning (ERP) system for ordering parts and scheduling manufacturing based on the at least one electrical schematic.

6. A system comprising:
means, including at least one processor coupled to a memory, for receiving input from an original equipment manufacturer (OEM), defining specifications for a heating ventilation and air conditioning (HVAC) product family;
means, responsive to the received input from the manufacturer and including at least one processor coupled to a memory and a display device, for enabling the OEM to select options for the HVAC product family; and
means, responsive to the selected options, for automatically defining at least one HVAC control panel electrical schematic;
wherein the means, responsive to the selected options, for automatically defining at least one HVAC control panel electrical schematic, comprises:
means for storing computer aid design (CAD) macros for a computer aided design tool; and
means for storing CAD macro attributes separate from the CAD macros, wherein one or more of the CAD macros are logically associated with at least two CAD macro attributes;
wherein each of the CAD macro attributes is associated with an HVAC product family, and
wherein the system further comprises:
means, responsive to the HVAC product family and to one or more of the selected options, for retrieving one or more CAD macros; and
means, responsive to the HVAC product family and to one or more of the selected options, for retrieving CAD macro attributes separate from the retrieved CAD macros;
wherein the means, responsive to the selected options, for automatically defining at least one HVAC control panel electrical schematic defines the schematic based on one or more of the retrieved CAD macros and the separately retrieved CAD macro attributes.

* * * * *